US 7,493,626 B2

(12) United States Patent
Resch

(10) Patent No.: US 7,493,626 B2
(45) Date of Patent: Feb. 17, 2009

(54) METHOD AND APPARATUS FOR COMMUNICATING BETWEEN DEVICE DRIVERS IN A COMPUTER SYSTEM

(75) Inventor: Paul M. Resch, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 783 days.

(21) Appl. No.: 10/406,297

(22) Filed: Apr. 2, 2003

(65) Prior Publication Data

US 2004/0199920 A1    Oct. 7, 2004

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/321; 719/327
(58) Field of Classification Search ........... 719/310, 719/321, 327
See application file for complete search history.

(56) References Cited

U.S. PATENT DOCUMENTS

| | | | | |
|---|---|---|---|---|
| 5,630,076 A | * | 5/1997 | Saulpaugh et al. | 710/104 |
| 5,794,035 A | * | 8/1998 | Golub et al. | 718/104 |
| 5,809,331 A | * | 9/1998 | Staats et al. | 710/10 |
| 5,819,107 A | * | 10/1998 | Lichtman et al. | 710/8 |
| 6,674,767 B1 | * | 1/2004 | Kadyk et al. | 370/466 |
| 6,714,998 B2 | * | 3/2004 | Hara et al. | 710/10 |
| 6,785,894 B1 | * | 8/2004 | Ruberg | 719/321 |
| 6,832,278 B2 | * | 12/2004 | Oshins et al. | 710/104 |
| 7,177,887 B2 | * | 2/2007 | Yang et al. | 707/204 |
| 2003/0088866 A1 | * | 5/2003 | Boldon et al. | 717/170 |
| 2003/0233487 A1 | * | 12/2003 | Ruget et al. | 709/321 |

OTHER PUBLICATIONS

"Microsoft Computer Dictionary," Fifth Edition, Microsoft Press, 2002; p. 155.*

* cited by examiner

Primary Examiner—Meng-Ai An
Assistant Examiner—Nathan Price
(74) Attorney, Agent, or Firm—Park, Vaughan & Fleming LLP

(57) ABSTRACT

One embodiment of the present invention provides a system that facilitates communicating between device drivers within a computing system. The system first determines a need to invoke a function on a remote device from a local device driver, wherein the local device driver is not able to perform the function on the remote device. Once the need has been determined, the system obtains a unique identifier for a remote device driver capable of performing the function on the remote device, and uses the unique identifier to facilitate invoking the function in the remote device driver from the local device driver.

21 Claims, 2 Drawing Sheets

METHOD AND APPARATUS FOR COMMUNICATING BETWEEN DEVICE DRIVERS IN A COMPUTER SYSTEM

BACKGROUND

1. Field of the Invention

The present invention relates to the process of configuring device drivers in a computer system. More specifically, the present invention relates to a method and an apparatus for communicating between device drivers in a computer system.

2. Related Art

Although computer systems are often built using standard hardware devices and components, the specific configuration of the devices and components can vary greatly between different computer system implementations. This configuration often affects the way the devices are controlled. When the computer system needs to change the state of a device, the computer system typically calls a driver, which contains all of the necessary information for interacting with the device. However, it can be difficult to control other computer system components outside of the device that affect the state of the device. For example, the clock and the power for a device are often managed through the use of a General Purpose Input Output (GPIO), or through a bit in a configuration register of the parent chip. In order to control these related components, a device driver can be specially configured to control these components. However, this means that device drivers may need to be reconfigured differently for each type of system configuration, which is a time-consuming and error-prone process.

Another example of where it is hard to control components associated with a device is interrupts. Interrupts are sometimes not routed to the driver responsible for taking action on the interrupt. For instance, an audio driver may expect to receive an interrupt for the audio hardware, but the interrupt for the headphone jack may come through a GPIO.

In yet another example, some hot-swappable devices need to know about the position of a release switch that needs to be released before the device can be physically removed from the computer system.

Designing systems to allow devices and drivers to be aware of hardware states outside of their control can be expensive and can require drivers to be modified for each different hardware configuration. Hence, what is needed is a method and an apparatus for configuring drivers to operate with hardware within a computer systems without the problems described above.

SUMMARY

One embodiment of the present invention provides a system that facilitates communicating between device drivers within a computing system. The system first determines a need to invoke a function on a remote device from a local device driver, wherein the local device driver is not able to perform the function on the remote device. Once the need has been determined, the system obtains a unique identifier for a remote device driver capable of performing the function on the remote device, and uses the unique identifier to facilitate invoking the function in the remote device driver from the local device driver.

In a variation on this embodiment, the system stores the unique identifier at the local device driver as a property of the local device driver to facilitate identifying the remote device driver capable of performing the function during subsequent invocations of the function.

In a variation on this embodiment, during a computer system boot sequence prior to receiving the request, the system identifies devices within the computer system and builds the device tree, including nodes for the identified devices. The system then assigns each device a unique identifier. The system also locates drivers for the identified devices and loads the drivers into memory.

In a further variation on this embodiment, the system scans properties of the drivers to identify platform-functions, wherein platform-functions are functions performed by a driver on a device that are able to be invoked by other drivers. As the platform-functions are located, the system builds a database containing platform-functions to facilitate identifying a driver that is capable of performing a given function on the device.

In a further variation on this embodiment, the device tree is saved in Read-Only Memory (ROM) so that during future initializations of the hardware, the device tree can be loaded from ROM, instead of having to identify the devices and construct the device tree.

In yet a further variation on this embodiment, platform-functions that are able to be executed on demand by the operating system are registered with the operating system.

In yet a further variation on this embodiment, identifying the device tree node involves querying the operating system to identify a device tree node that is associated with code that is capable of performing the function, wherein the operating system looks up the device tree node in the database.

In a variation on this embodiment, the system instructs the operating system to perform the function on the remote device. In this embodiment, the steps of obtaining the unique identifier for the remote device driver and invoking the function at the remote device driver are performed by the operating system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). However, this does not include computer instruction signals embodied in a transmission medium (with or without a carrier wave upon which the signals are modulated).

Computer System

Figure 1:
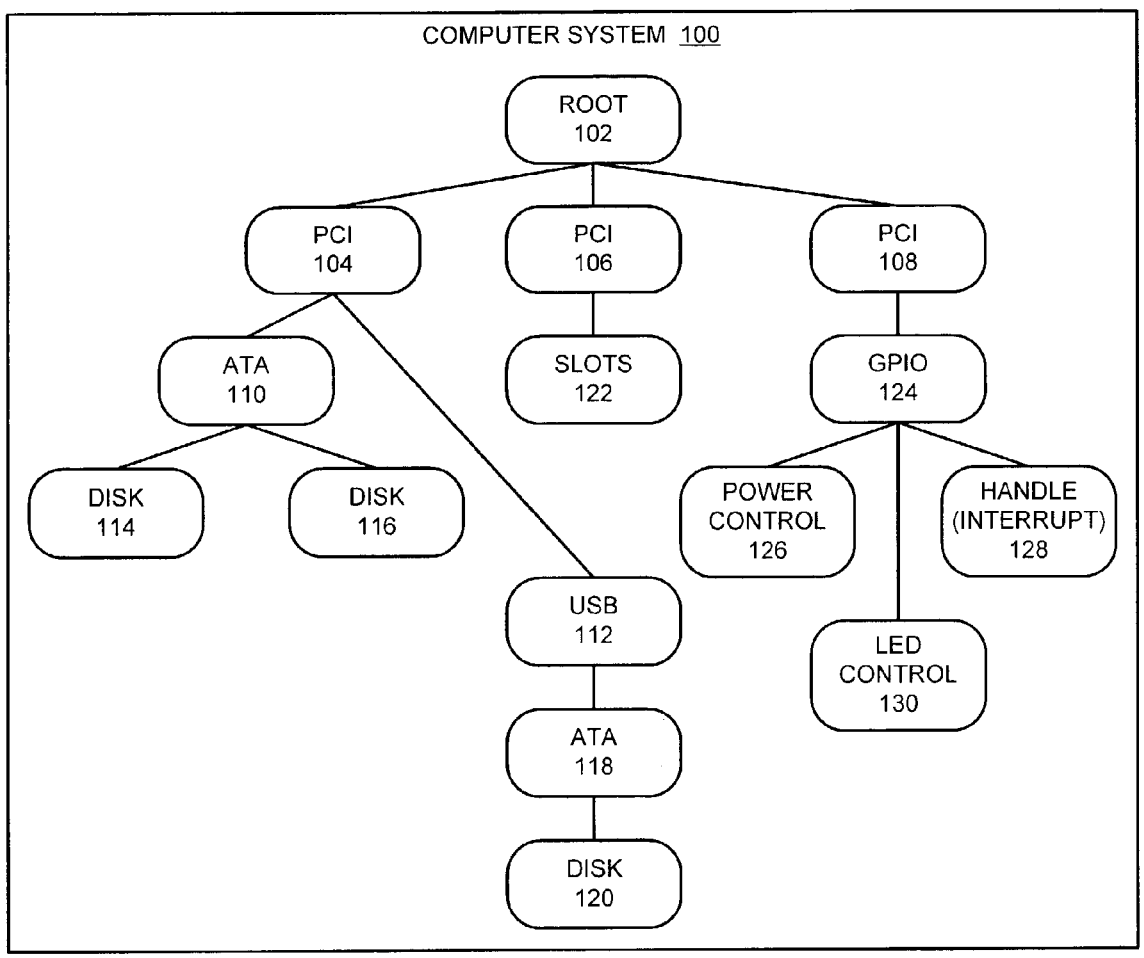
FIG. 1 illustrates a computer system in accordance with an embodiment of the present invention.

FIG. 1 illustrates computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

The operating system for computer system 100 maintains a device tree. This device tree has a root node 102. Coupled to root node 102 are Peripheral Component Interconnect (PCI) nodes 104-108. Advanced Technology Attachment (ATA) node 110, which controls disks 114 and 116, is coupled to PCI node 104 along with Universal Serial Bus (USB) node 112. In the present example, ATA node 118, which controls disk 120, is coupled to USB node 112. PCI node 106 is coupled to slots 122 which provide expansion possibilities for computer system 100. PCI node 108 is coupled to General-Purpose Input/Output (GPIO) node 124 which is coupled to power control node 126, handle (interrupt) node 128, and LED control node 130.

Each node in the device tree may also contain a driver for performing functions on the device associated with the node as well as for communicating with devices associated with parent and child nodes. For example, ATA node 118 can communicate with disk 120 and USB node 112, but does not know about PCI node 104. On the contrary, ATA node 110 can communicate with PCI node 104, but knows nothing about USB node 112.

In one embodiment of the present invention, disk 114 needs to perform functions at LED control node 130 as well as receive interrupts from handle (interrupt) node 128 and power information from power control node 126. Presently, because they are isolated from each other on the device tree, drivers must be specifically configured to control all of the nodes. Such programming prohibits the same drivers from being used on similar systems with slightly different device tree structures.

One embodiment of the present invention provides a mechanism that allows one device driver to cause a function to be invoked by another device driver. This eliminates the need for a driver to implement a mechanism to control devices that are not of the type for which the driver was written. In addition, information is provided in the device tree nodes that describe the specific method for performing functions on the device. This allows for general-purpose drivers to be written, rather than hand-coding drivers for specific computer system configurations.

GPIO devices such as power control node 126, handle (interrupt) node 128 and LED control node 130 control many functions for other devices or nodes in the device tree. For instance, power control node 126 controls the power for the ATA bus represented by ATA node 110, LED control node 130 controls the LEDs that indicate the status of disks 114 and 116, and handle (interrupt) node 128 provides the status of the handle that allows for hot-swapping disks 114 and 116. Properties in the device tree provide the basis for this new functionality. ATA node 110 contains several properties indicating specific functions, e.g. "enable drive power", and a unique identifier identifying the device tree node that can perform the function. The GPIO node that performs one of the ATA functions contains a property that identifies the device tree node for which it performs a function, as well as the specific method for performing the function, as well as when to perform the function. Note that the GPIO driver is not written to perform only the one function, but performs different functions depending on the properties of a given node. These functions are referred to as "platform-functions" due to the ability to call the functions from any node.

Identifying Platform-Functions

Figure 2:
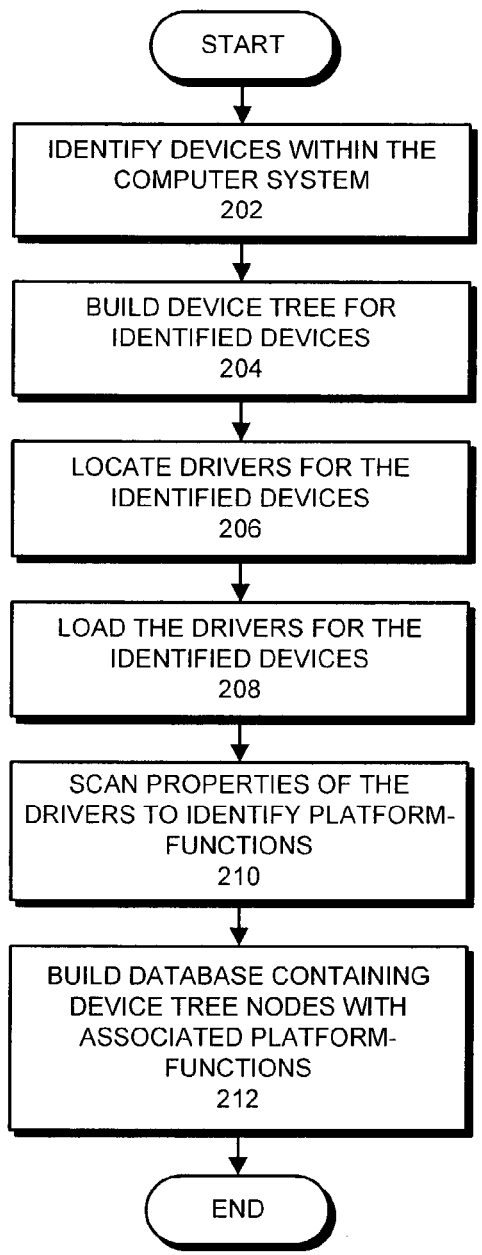
FIG. 2 presents a flowchart illustrating the process of identifying platform-functions in accordance with an embodiment of the present invention.

FIG. 2 presents a flowchart illustrating the process of identifying platform-functions in accordance with an embodiment of the present invention. During the boot sequence of the computer system, the system identifies devices within the computer system (step 202) and builds a device tree for the identified devices (step 204). In building the device tree, the system assigns each device a unique identifier to facilitate identification of the device. Note that in one embodiment of the present invention, the system saves the device tree and the unique identifiers in ROM, so that during future boot sequences, the device tree and the unique identifiers for the devices can be retrieved from ROM.

Once the devices have been identified, the system locates drivers for the identified devices (step 206) and loads the drivers for the identified devices (step 208). Upon loading the drivers, the system scans the properties of the drivers for platform-functions, or functions that can be invoked by general-purpose drivers at other nodes (step 210). The system also builds a database containing all of the device nodes and their corresponding platform-functions to facilitate future identification of nodes capable of performing specific functions (step 212). In one embodiment of the present invention, the OS uses this database to identify particular nodes capable of performing functions upon receiving a query from another driver.

Performing Platform-Functions

Figure 3:
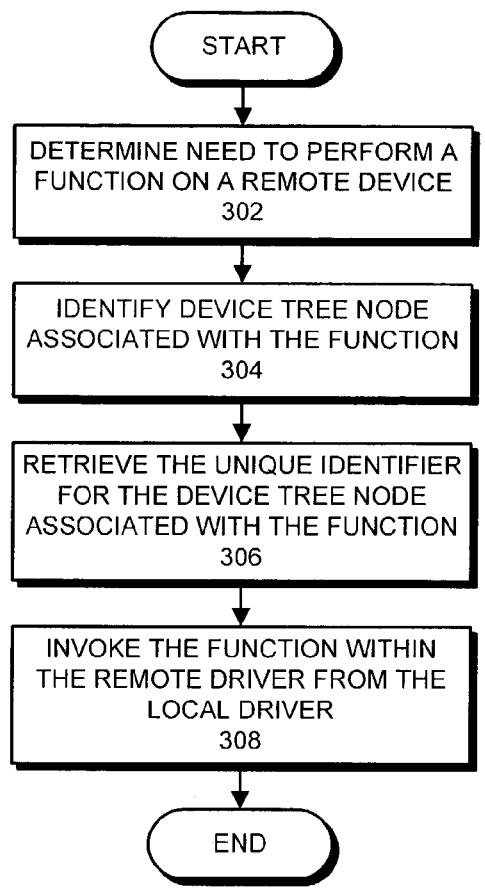
FIG. 3 presents a flowchart illustrating the process of performing a platform-function in accordance with an embodiment of the present invention.

FIG. 3 presents a flowchart illustrating the process of performing a platform-function in accordance with an embodiment of the present invention. The process starts when the system determines a need to perform a function on a remote device (step 302). Upon determining the need to perform the function, the system identifies the device tree node associated with the function (step 304). This can be accomplished by querying the OS, which in turn looks up the function in a database of platform-functions and returns the unique identifier of the device tree node that can perform the function (step 306). Once this information has been retrieved, the unique identifier for the device tree node that is capable of performing the function can be saved as a property in the local driver to prevent additional lookups during subsequent requests for the function.

In one embodiment of the present invention, the system invokes the function within the remote device driver from the local device driver by using the unique identifier for the remote device driver (step 308). In another embodiment of the present invention, the local device driver instructs the operating system to locate the remote device driver and to invoke the function within the remote driver.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating between device drivers within a computing system, comprising:

determining a need to invoke a function on a remote device from a local device driver that is associated with a local device, wherein the local device driver is not configured to perform the function on the remote device, wherein the local device and the remote device are different device types, and wherein the remote device is located on the same computing system as the local device, and the remote device and the local device are on different branches of a device tree for the computing system;

prior to determining the need to invoke the function, during a computer system boot sequence:
  identifying devices within the computer system,
  building a device tree, including nodes for the identified devices, and
  assigning each device a unique ID;

obtaining a unique identifier for a remote device driver capable of performing the function on the remote device;

using the unique identifier to facilitate invoking the function in the remote device driver from the local device driver; and storing the unique identifier at the local device driver as a property of the local device driver to facilitate identifying the remote device driver capable of performing the function during subsequent invocations of the function.

2. The method of claim 1, wherein prior to determining the need to invoke the function, during a computer system boot sequence, the method further comprises:
  locating drivers for the identified devices; and
  loading the drivers into memory.

3. The method of claim 2, further comprising:
  scanning properties of the drivers to identify platform-functions, wherein platform-functions are functions performed by a driver on a device that are able to be invoked by other drivers; and
  building a database containing platform-functions to facilitate identifying a driver that is capable of performing a given function on the device.

4. The method of claim 3, wherein the device tree is saved in Read-Only Memory (ROM) so that during future initializations of the hardware, the device tree can be loaded from ROM, instead of having to identify the devices and construct the device tree.

5. The method of claim 3, wherein platform-functions, which are able to be executed on demand by the operating system, are registered with the operating system.

6. The method of claim 5, wherein obtaining the unique identifier for the remote device driver involves querying the operating system to identify the device driver that is capable of performing the function, wherein the operating system looks up the device driver in the database.

7. The method of claim 1, further comprising instructing the operating system to perform the function;
  wherein the steps of obtaining the unique identifier for the remote device driver and invoking the function at the remote device driver are performed by the operating system.

8. A computer-readable storage medium storing instructions that when executed by a computer cause the computer to perform a method for communicating between device drivers within a computing system, comprising:
  determining a need to invoke a function on a remote device from a local device driver that is associated with a local device, wherein the local device driver is not configured to perform the function on the remote device, wherein the local device and the remote device are different device types, and wherein the remote device is located on the same computing system as the local device, and the remote device and the local device are on different branches of a device tree for the computing system;

prior to determining the need to invoke the function, during a computer system boot sequence:
    identifying devices within the computer system,
    building a device tree, including nodes for the identified devices, and
    assigning each device a unique ID;

obtaining a unique identifier for a remote device driver capable of performing the function on the remote device;

using the unique identifier to facilitate invoking the function in the remote device driver from the local device driver; and storing the unique identifier at the local device driver as a property of the local device driver to facilitate identifying the remote device driver capable of performing the function during subsequent invocations of the function.

9. The computer-readable storage medium of claim 8, wherein prior to determining the need to invoke the function, during a computer system boot sequence, the method further comprises:
  locating drivers for the identified devices; and
  loading the drivers into memory.

10. The computer-readable storage medium of claim 9, wherein the method further comprises:
  scanning properties of the drivers to identify platform-functions, wherein platform-functions are functions performed by a driver on a device that are able to be invoked by other drivers; and
  building a database containing platform-functions to facilitate identifying a driver that is capable of performing a given function on the device.

11. The computer-readable storage medium of claim 10, wherein the device tree is saved in Read-Only Memory (ROM) so that during future initializations of the hardware, the device tree can be loaded from ROM, instead of having to identify the devices and construct the device tree.

12. The computer-readable storage medium of claim 10, wherein platform-functions, which are able to be executed on demand by the operating system, are registered with the operating system.

13. The computer-readable storage medium of claim 12, wherein obtaining the unique identifier for the remote device driver involves querying the operating system to identify the device driver that is capable of performing the function, wherein the operating system looks up the device driver in the database.

14. The computer-readable storage medium of claim 8, wherein the method further comprises instructing the operating system to perform the function;
  wherein the steps of obtaining the unique identifier for the remote device driver and invoking the function at the remote device driver are performed by the operating system.

15. An apparatus having a computer system for communicating between device drivers within a computing system, the computer system comprising:
  a determination mechanism configured to determine a need to invoke a function on a remote device from a local device driver that is associated with a local device, wherein the local device driver is not configured to perform the function on the remote device, wherein the local device and the remote device are different device types, and wherein the remote device is located on the same computing system as the local device, and the remote device and the local device are on different branches of a device tree for the computing system;

wherein the determination mechanism is further configured to perform the following operations during a computer system boot sequence, prior to determining the need to invoke the function:
  identify devices within the computer system,
  build a device tree, including nodes for the identified devices, and
  assign each device a unique ID;
a retrieval mechanism configured to obtain a unique identifier for a remote device driver capable of performing the function on the remote device;
an invocation mechanism configured to invoke the function in the remote device driver from the local device driver using the unique identifier; and
a storage mechanism configured to store the unique identifier at the local device driver as a property of the local device driver to facilitate identifying the remote device driver capable of performing the function during subsequent invocations of the function.

16. The apparatus of claim 15, further comprising a boot mechanism, wherein the boot mechanism includes:
  a location mechanism configured to locate drivers for the identified devices; and
  a load mechanism configured to load the drivers into memory.

17. The apparatus of claim 16, further comprising:
a scanning mechanism configured to scan properties of the drivers to identify platform-functions, wherein platform-functions are functions performed by a driver on a device that are able to be invoked by other drivers; and
a database mechanism configured to build a database containing platform-functions to facilitate identifying a driver that is capable of performing a given function on the device.

18. The apparatus of claim 17, wherein the boot mechanism is configured to save the device tree in Read-Only Memory (ROM) so that during future initializations of the hardware, the device tree can be loaded from ROM.

19. The apparatus of claim 17, wherein the boot device is additionally configured to register platform-functions, which are able to be executed on demand by the operating system, with the operating system.

20. The apparatus of claim 19, wherein the retrieval mechanism is additionally configured to query the operating system to identify the device driver that is capable of performing the function, wherein the operating system looks up the device driver in the database.

21. The apparatus of claim 15, further comprising an instruction mechanism configured to instruct the operating system to perform the function;
  wherein the functions performed by the retrieval mechanism and the invocation mechanism are performed by the operating system.

* * * * *